US012335546B2

(12) United States Patent
Neugeboren et al.

(10) Patent No.: US 12,335,546 B2
(45) Date of Patent: *Jun. 17, 2025

(54) PARTIAL VIDEO ASYNC SUPPORT USING R-MACPHY DEVICE

(71) Applicant: ARRIS Enterprises LLC, Horsham, PA (US)

(72) Inventors: Yair Neugeboren, Netanya (IL); Kevin Garvey, Cork (IE); Humphrey Looney, Cork (IE); Stephen Dunning, Cork (IE); Chris Harrison, Cork (IE)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,038

(22) Filed: Jan. 5, 2024

(65) Prior Publication Data

US 2024/0146984 A1    May 2, 2024

Related U.S. Application Data

(63) Continuation of application No. 18/079,830, filed on Dec. 12, 2022, now Pat. No. 11,902,605, which is a
(Continued)

(51) Int. Cl.
*H04N 21/242* (2011.01)
*H04H 20/78* (2008.01)
(Continued)

(52) U.S. Cl.
CPC .......... *H04N 21/242* (2013.01); *H04H 20/78* (2013.01); *H04N 21/23406* (2013.01); *H04N 21/64723* (2013.01); *H04N 21/64792* (2013.01)

(58) Field of Classification Search
CPC . H04H 20/78; H04J 3/0641; H04N 21/23406; H04N 21/242; H04N 21/4305; H04N 21/64723; H04N 21/64792
See application file for complete search history.

(56) References Cited

U.S. PATENT DOCUMENTS 5,841,771 A * 11/1998 Irwin ................. H04Q 11/0478
                                                                370/383
6,357,028 B1 * 3/2002 Zhu ..................... H04N 21/6377
                                                                714/751

(Continued)

OTHER PUBLICATIONS

Cable Labs; "Data-Over-Cable Service Interface Specifications; MHAv2; Remote PHY Specification; CM-SP-R-PHY-116-210804"; Aug. 4, 2021; Cable Television Laboratories, Inc.; 477 pages.
(Continued)

*Primary Examiner* — Michael B. Pierorazio
(74) *Attorney, Agent, or Firm* — Chernoff, Vilhauer, McClung & Stenzel, LLP

(57) ABSTRACT

Systems and methods for providing timing information from a R-MACHPHY device to a video core while the R-MACPHY device receives video data from the video core while operating in asynchronous mode. In some embodiments, the R-MACPHY device may alternately and selectively configure its mode of operation to alternate between synchronous mode and asynchronous mode, and provide the timing information to the video core when it switches to asynchronous mode.

15 Claims, 4 Drawing Sheets

Related U.S. Application Data continuation of application No. 17/538,878, filed on Nov. 30, 2021, now Pat. No. 11,528,521.

(60) Provisional application No. 63/168,032, filed on Mar. 30, 2021, provisional application No. 63/119,954, filed on Dec. 1, 2020.

(51) Int. Cl.
*H04N 21/234* (2011.01)
*H04N 21/647* (2011.01)

(56) References Cited

U.S. PATENT DOCUMENTS

| | | | | |
|---|---|---|---|---|
| 6,396,850 B1* | 5/2002 | de Vito | | H04N 7/1675 |
| | | | | 348/E7.056 |
| 6,665,345 B1* | 12/2003 | Sekiguchi | | H04N 19/66 |
| | | | | 375/E7.279 |
| 6,980,731 B1* | 12/2005 | Tahara | | H04N 21/43632 |
| | | | | 386/E9.036 |
| 6,983,323 B2* | 1/2006 | Cantrell | | H04L 69/22 |
| | | | | 709/225 |
| 7,617,509 B1* | 11/2009 | Brunheroto | | H04N 17/004 |
| | | | | 725/19 |
| 7,760,826 B2* | 7/2010 | Chang | | H04L 25/03019 |
| | | | | 375/346 |
| 8,279,884 B1* | 10/2012 | Narasimha | | H04L 47/365 |
| | | | | 370/410 |
| 8,284,259 B2* | 10/2012 | Karacali-Akyamac | | |
| | | | | H04L 43/024 |
| | | | | 348/180 |
| 8,620,275 B2* | 12/2013 | Minear | | H04N 21/812 |
| | | | | 725/62 |
| 9,203,498 B2* | 12/2015 | Ohayon | | H04L 69/324 |
| 10,735,120 B1* | 8/2020 | Kantharaju | | H04L 43/087 |
| 11,528,521 B2* | 12/2022 | Neugeboren | | H04N 21/23406 |
| 2002/0053053 A1* | 5/2002 | Nagai | | H04L 1/205 |
| | | | | 375/E7.016 |
| 2002/0196363 A1* | 12/2002 | Furusawa | | H04N 21/4344 |
| | | | | 348/461 |
| 2003/0051254 A1* | 3/2003 | Weidenfeller | | H04L 65/613 |
| | | | | 725/98 |
| 2004/0105463 A1* | 6/2004 | Cheung | | H04L 1/0001 |
| | | | | 370/468 |
| 2004/0153940 A1* | 8/2004 | Yu | | H03M 13/2957 |
| | | | | 714/746 |
| 2005/0100100 A1* | 5/2005 | Unger | | H04N 21/6373 |
| | | | | 375/E7.134 |
| 2005/0120124 A1* | 6/2005 | Korhonen | | H04L 1/18 |
| | | | | 714/746 |
| 2005/0180415 A1* | 8/2005 | Cheung | | H04N 21/6437 |
| | | | | 348/E7.071 |
| 2005/0262529 A1* | 11/2005 | Neogi | | H04N 21/63345 |
| | | | | 725/31 |
| 2007/0053303 A1* | 3/2007 | Kryuchkov | | H04L 43/0852 |
| | | | | 370/252 |
| 2008/0075031 A1* | 3/2008 | Ohayon | | H04N 21/6143 |
| | | | | 370/316 |
| 2008/0192119 A1* | 8/2008 | Li | | H04N 21/44209 |
| | | | | 348/180 |
| 2008/0259962 A1* | 10/2008 | Mori | | H04N 21/4305 |
| | | | | 375/E7.278 |
| 2009/0158326 A1* | 6/2009 | Hunt | | H04N 5/783 |
| | | | | 725/38 |
| 2009/0276821 A1* | 11/2009 | Amento | | H04N 21/44226 |
| | | | | 725/116 |
| 2010/0080305 A1* | 4/2010 | Guo | | H04N 21/4382 |
| | | | | 375/E7.279 |
| 2010/0091888 A1* | 4/2010 | Nemiroff | | H04N 19/115 |
| | | | | 375/E7.154 |
| 2011/0222669 A1* | 9/2011 | Buriano | | H04L 65/752 |
| | | | | 379/32.01 |
| 2012/0042091 A1* | 2/2012 | McCarthy | | H04N 21/812 |
| | | | | 709/231 |
| 2012/0116758 A1* | 5/2012 | Murgia | | G10L 19/24 |
| | | | | 704/226 |
| 2013/0028121 A1* | 1/2013 | Rajapakse | | H04N 21/40 |
| | | | | 370/252 |
| 2013/0044803 A1* | 2/2013 | Fisher | | H04N 21/8455 |
| | | | | 709/231 |
| 2013/0089140 A1* | 4/2013 | Kudana | | H04N 19/152 |
| | | | | 375/240.03 |
| 2013/0340023 A1* | 12/2013 | Yoshimoto | | H04N 21/6375 |
| | | | | 725/116 |
| 2014/0013342 A1* | 1/2014 | Swan | | H04N 21/4821 |
| | | | | 725/92 |
| 2014/0233587 A1* | 8/2014 | Liu | | H04L 47/782 |
| | | | | 370/468 |
| 2015/0082366 A1* | 3/2015 | French | | H04N 21/6371 |
| | | | | 725/116 |
| 2015/0189394 A1* | 7/2015 | French | | H04L 65/611 |
| | | | | 725/109 |
| 2015/0295669 A1 | 10/2015 | Chapman et al. | | |
| 2016/0165266 A1* | 6/2016 | Bocharnikov | | H04N 21/242 |
| | | | | 725/109 |
| 2016/0261896 A1* | 9/2016 | Bocharnikov | | H04N 21/23424 |
| 2016/0295254 A1* | 10/2016 | Chen | | H04N 21/23406 |
| 2017/0111686 A1* | 4/2017 | Quere | | H04N 21/8547 |
| 2017/0302378 A1* | 10/2017 | Mutalik | | H04L 12/2856 |
| 2018/0295050 A1* | 10/2018 | Lee | | H04L 43/04 |
| 2019/0014050 A1* | 1/2019 | Wang | | H04L 49/9005 |
| 2019/0116057 A1* | 4/2019 | Colson | | H04L 12/2801 |
| 2019/0207690 A1* | 7/2019 | Mäki | | H04Q 11/00 |
| 2019/0327499 A1* | 10/2019 | Poli | | H04N 21/2353 |
| 2020/0195361 A1 | 6/2020 | Neugeboren | | |
| 2022/0053491 A1* | 2/2022 | Sevindik | | H04W 72/0453 |

OTHER PUBLICATIONS

Cable Labs; "Data-Over-Cable Service Interface Specifications; MHAv2; Remote Downstream External PHY Interface Specification; CM-SP-R-DEPI-I16-210804"; Aug. 4, 2021; Cable Television Laboratories, Inc.; 111 pages.

International Search Report and Written Opinion RE: Application No. PCT/US2021/061263, dated May 19, 2022.

\* cited by examiner

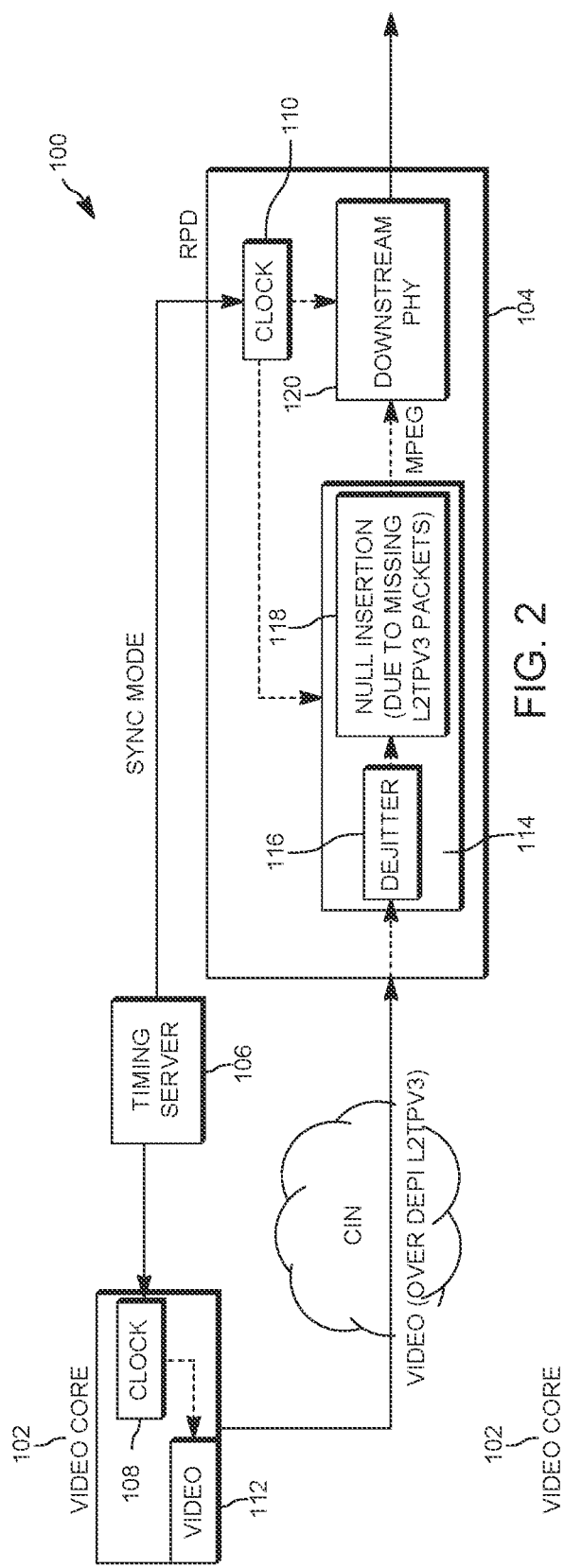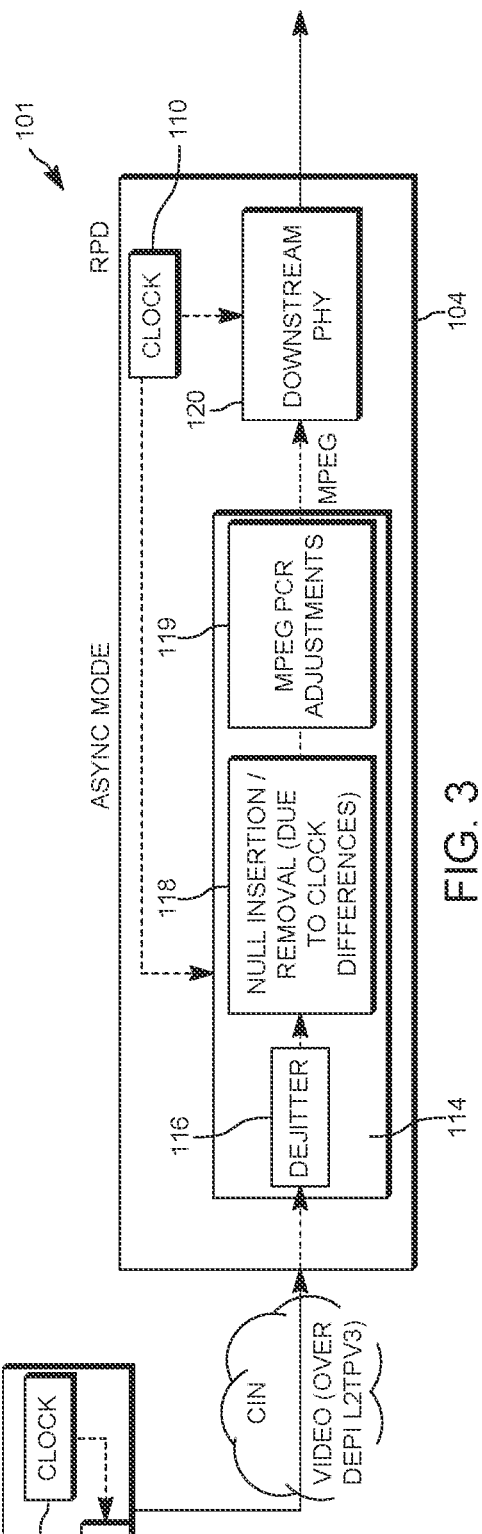

PARTIAL VIDEO ASYNC SUPPORT USING R-MACPHY DEVICE

CROSS REFERENCE TO RELATED APPLICATIONS

This application is a continuation of U.S. patent application Ser. No. 18/079,830, filed Dec. 12, 2022, which is a continuation of U.S. patent application Ser. No. 17/538,878, filed Nov. 30, 2021, now U.S. Pat. No. 11,528,521, which claims the benefit of U.S. Provisional Patent Application No. 63/168,032, filed Mar. 30, 2021, and U.S. Provisional Patent Application No. 63/119,954, filed Dec. 1, 2020, both of which are incorporated herein by reference in their entireties.

BACKGROUND

The subject matter of this application generally relates to the delivery of video content using distributed access architectures (DAA) of a hybrid CATV network, and more particularly to architectures that distribute the functions of the Cable Modem Termination System between a core and a remote device synchronized to the core, such as a Remote PHY device or Remote MACPHY device.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

Historically, the head end also included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system (EdgeQAM) in a single platform called the Converged Cable Access Platform (CCAP).

As networks have expanded and head ends have therefore become increasingly congested with equipment, many content providers have recently used distributed architectures to spread the functionality of the CMTS/CCAP throughout the network. This distributed architecture keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CMTS or CCAP by pushing it to the network's fiber nodes. Thus, while the core in the CMTS/CCAP performs the higher layer processing, the R-PHY device in the node converts the downstream data sent by the core from digital to analog to be transmitted on radio frequency, and converts the upstream RF data sent by cable modems from analog to digital format to be transmitted optically to the core. Another distributed access architecture is Remote MAC PHY (R-MACPHY) where, not only is the physical layer of the traditional CMTS pushed into the network, but the functionality Media Access Control (MAC) layer, which is one of the two layers that constitute the data link layer of a transport stream, is also assigned to one or more nodes in the network in what is called a Remote MACPHY device (RMD).

Once the functionality of the CMTS/CCAP is divided between a core in the head end and various PHY or MAC-PHY devices throughout the network, however, protocols must be established to accurately preserve the timing of reconstructed video data that is communicated throughout the network. One typical arrangement to accurately preserve the timing of communicated video data is to ensure that the clocks of the various devices in the network are synchronized. FIG. 1, for example, shows an exemplary topology 10 that provides synchronization between a CCAP core 14 and an RPD 16, which is connected to one or more "consumer premises equipment (CPE) devices 18, though it should be noted that a similar topology may be used between a core and an RMD, for example. A timing grandmaster device 12 provides timing information to both the CCAP core 14 and the RPD 16. Specifically, the timing grandmaster 12 has a first master port 20a connected to a slave clock 22 in the CCAP core 14 and a second master port 20b connected to a slave clock 24 in the RPD 16, though alternatively the respective slave clocks of the CCAP core 14 and the RPD 16 may both be connected to a single master port in the timing grandmaster device 12. The CCAP core 14 may be connected to the timing grandmaster 12 through one or more switches 26 while the RPD 16 may be connected to the timing grandmaster 12 through one or more switches 28. Although FIG. 1 shows only one RPD 16 connected to the timing grandmaster 12, many such RPDs may be simultaneously connected to the grandmaster 12, with each RPD having a slave clock 24 receiving timing information from a port 20b in the grandmaster clock 12.

While both the core 14 and the RPD 16 are locked with the timing grandmaster 12, no significant problems occur, but problems will occur when either the RPD 16 or the core 14 lose connection to the timing grandmaster 12. In that holdover period where one or both devices have no connection to the timing clock of the grandmaster 12, the unconnected devices will drift in frequency and phase from the timing grandmaster 12 and from the other device. The magnitude of that drift will depend on many factors, including the length of the holdover period, temperature variations, internal oscillator performance etc. For example, an RPD with a typical TCXO oscillator might drift 1 ms in phase even within one hour. Typically, an RPD's drift is worse than the core's drift as the core usually has a better oscillator and is in a temperature-controlled environment. If the period of holdover during which drift occurs is of a sufficient duration, video quality will degrade to an unacceptable level.

Alternative asynchronous architectures do not rely upon synchronization between a core and downstream devices like RPDs and RMDs, but these architectures involve more complicated processing and frequently result in dropped data packets.

What is desired therefore, are improved architectures and methods for accurately preserving timing information associated with video data transmitted in distributed access architectures.

BRIEF DESCRIPTION OF THE DRAWINGS

For a better understanding of the invention, and to show how the same may be carried into effect, reference will now be made, by way of example, to the accompanying drawings, in which:

FIG. 2 shows an architecture where a video core transmits video data to an RPD in sync mode.

FIG. 3 shows an architecture where the video core of FIG. 2 transmits video data to the RPD of FIG. 2 in async mode.

DETAILED DESCRIPTION

Figure 1:
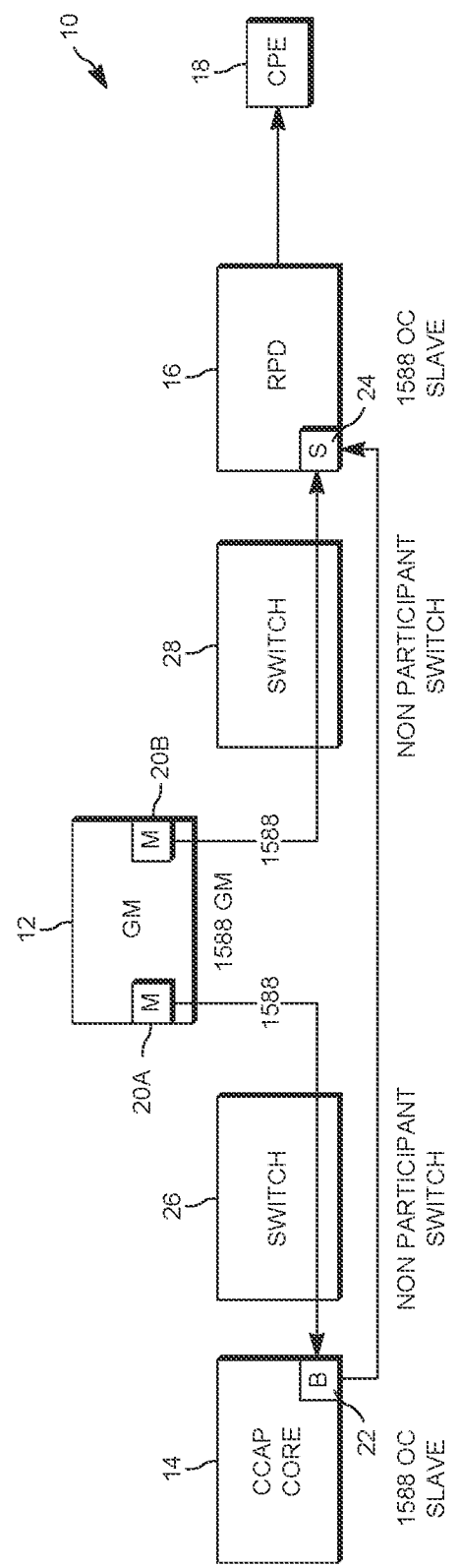
FIG. 1 shows an exemplary R-PHY system where both a CCAP core and its RPDs are timing slaves to an external grandmaster clock (GM).

As noted previously, in Distributed Access Architectures for delivery of video content, two modes of video handling may be used—synchronous mode and asynchronous mode. Typically, network devices have hardware capable of operating in either mode, with software that enables configuration by a video core of itself and connected downstream devices into either alternate one of these modes when setting up video channels. In sync (synchronous) mode, the RPD (or RMD) and its video core are synchronized in time to the same reference clock. In this sync mode the RPD is required merely to detect lost video packets using the Layer 2 Tunneling Protocol v. 3 (L2TPv3) sequence number monitoring, and insert MPEG null packets for each missing packet. This is a relatively simple implementation where there is no requirement for any additional modifications to the video stream.

FIG. 2, for example, shows a system in a first configuration 100 where a video core 102 communicates with an RPD 104 in synchronous mode using a common grandmaster timing server 106. The timing server 106 maintains an identical timing lock (i.e. frequency and phase) with both the clock 108 in the video core 102 and the clock 110 in the RPD 104. The video core 102 has a video streamer 112 that forwards video data packet to the RPD 104 via a Downstream External PHY Interface (DEPI) using L2TPv3. The video packets sent from the video core 102 to the RPD 104 will typically include all information necessary to decode the packetized elementary video transport stream, such as Program Identifiers (PIDs), Program Clock Reference (PCR) data, etc.

The RPD 110 in turn, receives the video packets sent from the video core 108 in a dejitter buffer 116 of a processing device 114. The dejitter buffer 116 receives and outputs packet data at a rate that removes network jitter resulting from differing paths of received packet data, or other sources of varying network delay between the video core and the RPD. Because some packets sent by the video streamer 112 may be lost or misplaced during transport to the RPD 104, the packets output from the dejitter buffer 116 may preferably be forwarded to a module 118 that, in the case of sync mode, inserts null packets in the data stream to account for those lost packets, so as to maintain the proper timing rate of the transmitted video. The transport stream, with any necessary insertion of null packets is then forwarded to a PHY device 120, which may decode the packetized elementary stream into a sequence of decoded video frames for downstream delivery to end-users by outputting QAM-modulated data in a format expected by customer-premises equipment, like set-top boxes. Alternatively, the PHY device may simply forward the packetized data, without decoding, to e.g. a cable modem for decoding by a user device such as a computer, tablet, cell phone, etc.

Alternatively, the system just described may be configured to operate in an asynchronous (async) mode. In async mode, the RPD 104 and its video core 102 are not synchronized in time to the same reference clock. Instead, the RPD 104 is required to detect the difference between its own clock 110 and the clock 108 of the video core 102 and be able to either insert or remove MPEG packets as necessary to maintain expected MPEG bitrate, and also adjust the MPEG PCR values due to the removal/insertion of the MPEG packets.

FIG. 3, for example, shows the hardware of FIG. 2 configured to instead operate in async mode. In this configuration 101, the clock 108 of the video core 102 and the clock 110 of the RPD 104 are not synchronized and may therefore drift relative to each other. The video streamer 112 of the video core 102 forwards packets of the packetized video data elementary stream to the RPD 104, which again receives the data in dejitter buffer 116 to remove network jitter, as described previously. However, unlike the configuration of FIG. 2, the packets output from the dejitter buffer 116 are forwarded to the module 118 which both adds null packets when needed, and drops packets when needed, in order to maintain the proper constant bit rate of the data received from the dejitter buffer 116. Further, after packets are added/dropped as needed, a PCR module 119 re-stamps the data packets with updated PCRs due to the removal/ insertion of MPEG packets before forwarding the re-stamped packets to the PHY device 120.

Although the systems 100 and 101 shown in FIGS. 2 and 32 are shown for illustrative purposes using an RPD 104 connected to a video core 102, those of ordinary skill in the art will appreciate that RMDs may also be connected to the video core 102 and have the same components shown with respect to the RPD 104 operate in the same manner as the RPD 104.

There are advantages and disadvantages to each of the synchronous and asynchronous modes of operation. With respect to the asynchronous mode, the main advantage is the that there is no reliance on clock synchronization between the video core 112 and RPD 114; the RPD 114 will detect those clock differences and "fix" the MPEG output accordingly. The main disadvantages of asynchronous mode is that this mode is more complicated with respect to the video processing that occurs in the RPD 114 during synchronous mode, and that that in order to correct timing discrepancies, the RPD 114 needs to occasionally drop MPEG packets from the input stream. This adverse effect can be mitigated if the video core adds null packets to the stream so the RPD will have a null packet in hand when it needs to drop a packet, but this option adds unnecessary bandwidth to the data stream and/or adversely affects video quality, and frequently the video core does not add enough null packets to completely eliminate the necessity of dropping data-carrying packets.

For synchronous mode, the main advantage is the simplicity of video processing in the RPD where there is no need for the RPD to track changes between the input video stream and its internal clock, and no need for applying any MPEG modifications except of maintain a constant bitrate at its output by adding MPEG Null packets in case of a detected missing input packet. The main disadvantage of synchronous mode is the reliance on clock synchronization between the RPD and the video core. Although this assumption is usually valid as the video core and/or the RPD do not often lose connection to the grandmaster clock, there are circumstances when such connection is lost, and even when it is not, there may be cases where the clocks of the core and the RPD will not be adequately synchronized, due to differences in network delays in timing messages with the grandmaster clock, for example, or internal issues with wither the core or the RPD. In any of these instances, since the RPD in synchronous mode will not adjust any MPEG PCRs, the clock difference may cause an illegal MPEG streamout of the RPD, which could lead to observable degradation in video quality.

In some preferred embodiments, the system depicted in FIGS. 2 and 3 may have the RPD 104 dynamically shift from synchronous mode to asynchronous mode based on information retrieved from the dejitter buffer 116. In such embodiments, the RPD may be configured to operate in synchronous mode as shown in FIG. 2 by default, until a conditional event is triggered, after which the RPD 104 switches to asynchronous mode as shown in FIG. 3. The RPD 104 will thereafter remain in asynchronous mode until a second conditional event is detected, after which the RPD 104 will change back to synchronous operation as shown in FIG. 2.

In some embodiments, the conditional event(s) may be based on a measurement of the state of the dejitter buffer 116. Thus, for example, the RPD 104 may preferably implement a first threshold based on the measurement, beyond which the video stream is assumed to be out of sync. The threshold could be defined in many different ways. For example, a suitable first threshold could be a maximum average change (plus or minus) in a fullness status of the buffer from a predefined standard operating level. The RPD 104 may therefore measure the fullness state of the buffer, in some embodiments optionally averaging it or otherwise applying a filter to eliminate temporary spikes of network jitter, and if the measured value crosses a predefined first threshold of change, the stream is assumed to be out of sync. An exemplary such first threshold in a preferred embodiment may be +/−25%. In some preferred embodiments, this first threshold may be configurable.

An alternate threshold might be a value measuring the rate of the buffer filling up/emptying. The RPD 104 may measure such a metric, again by optionally filtering it to remove transitory changes due to network jitter. If the rate of change crosses a predefined threshold, the video stream is assumed to be out of sync.

The RPD 104 may also preferably implement a second threshold for dynamically transitioning from asynchronous mode back to synchronous mode. In some embodiments, the second threshold may be the same as the first threshold for transitioning to asynchronous mode, but in other embodiments, the first and second thresholds are different. If different thresholds are used, the second threshold is preferably more stringent than the first threshold. For example, using the foregoing example where a first threshold of +/−25% is set as a limit at which the RPD dynamically transitions from synchronous mode to asynchronous mode, then a second threshold of +/−15% may be used to dynamically transition back to synchronous mode. Again, in some preferred embodiments, the second threshold may be configurable.

In some embodiments, when the RPD 104 is operating in asynchronous mode, in order to reduce the probability of dropping "important" MPEG packets if NULL packets are not available, the RPD 104 may implement a priority list of packets to be dropped (where a null packet is the first in priority to be dropped, then a set of PID values (e.g. SI PIDs, CAT PID etc.). Other methods may be applied to reduce the probability of dropping essential MPEG packets, such as prioritizing I-frames over P- and B-frames, and prioritizing P-frames over B-frames. Alternative implementations may use a priority-based approach of dynamically reducing the packet rate in the bitstream of Program Specific Information (PSI)—such as Program Association Table (PAT) data or Program Mapping Table (PMT) data—to the minimum rate allowed by the MPEG standard.

Because, the switch to asynchronous mode is made after a buffer state departs from a nominal or optimal value by a threshold amount, in some embodiments, the RPD 104 may decide to 'pull' a queue back to its nominal or optimal depth before switching again to synchronous mode in order to preserve jitter head-room. This may be appropriate, for example, when the first threshold is set to a low value for low latency.

Figure 4:
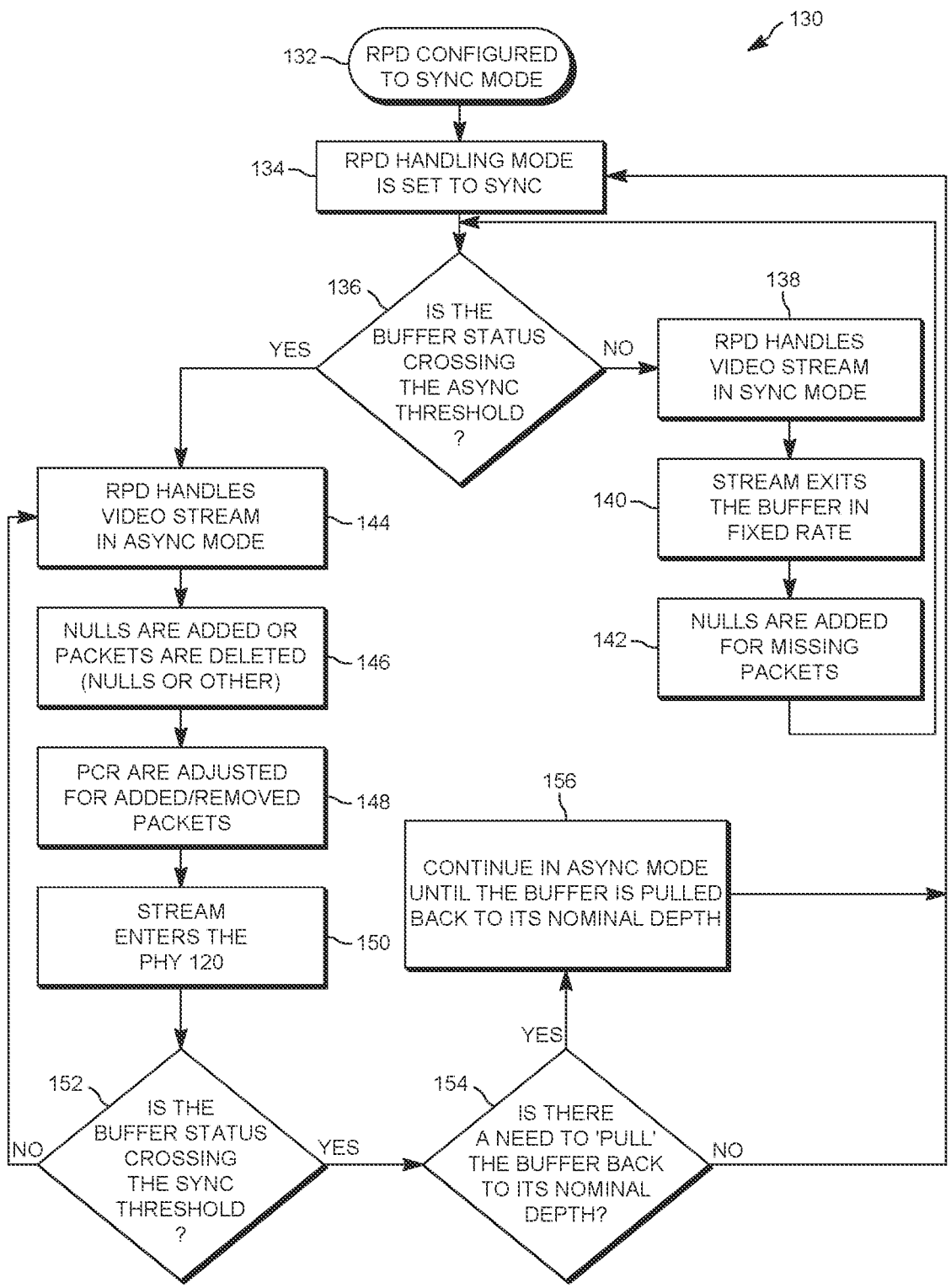
FIG. 4 shows an exemplary method for the architecture of FIGS. 2 and 3 to dynamically transition between sync and async mode.

FIG. 4 shows an exemplary method by which an RPD 104 may dynamically switch between synchronous mode and asynchronous mode. At step 132 an RPD is configured to operate in synchronous mode. At step 134 the handling mode of the RPD 104 is set to "sync." At decision step 136, it is determined if the buffer status crosses a first threshold, as previously described. If the answer is "no" then the method proceeds to step 138 where the RPD 104 handles the video stream in "sync" mode, and then to step 140 where it is determined whether the data exits the buffer 116 at a fixed rate, and to step 142 where null packets are added to maintain a fixed bitrate entering the PHY 120, if needed. The procedure then reverts to step 136 to again determine whether the buffer state exceeds the first threshold.

If, at step 136, it is determined that the buffer state exceeds the first threshold, the method then proceeds to step 144 where the RPD handing mode is set to "async." Then at step 146 null packets are added or packets are deleted and at step 148 PCR stamps for the packets are adjusted due to added and removed packets. At step 148 packets enter the PHY at a fixed bitrate.

At decision step 152 it is determined whether the status of the buffer 116 crosses the second threshold. If it does not, the procedure reverts to step 144. If it does, then the procedure may proceed to optional steps 154 and 156. At decision step 154, it is determined whether there is a need to place the buffer back at an optimal or nominal depth. If the answer is no, then the system reverts back to step 134 where the handling mode of the RPD 104 is set to "sync." If the answer is "yes" then at step 156 async mode is continued until then buffer is pulled back to its nominal or optimal depth, after which the procedure then reverts to step 134 as previously described.

Those of ordinary skill in the art will appreciate that, although the systems and methods described with respect to FIGS. 2-4 were exemplified using a video core connected to an RPD, the preceding disclosure also applies to communications between a video core and an RMD. However, while an RPD must usually rely on an external source to provide its timing information, RMDs typically include hardware components that include their own oscillator for operating an independent clock in the RMD. Thus, where a network such as the ones previously described includes one or more MACPHY devices, the present application discloses an additional partial async mode that in some embodiments may be used in conjunction with the foregoing systems and methods, or in alternate embodiments may be used in systems or methods in which remote devices such as RMDs and RPDs do not dynamically alternate between sync mode and async mode.

Specifically, although a downstream network device such as an RPD or RMD when operating in async mode theory detects clock differences between itself and core and "fixes" its MPEG output accordingly, for this to work both the video core and RMD must have an oscillator of a sufficient quality to maintain an MPEG compliant clock (~30 PPM accuracy and ~10 PPM/hour drift). Since RMDs are a hardware built platform, it is common to have an oscillator that would meet these requirements for its Data Over Cable Service Interface Specification (DOCSIS) operations, which have stricter clock requirement than MPEG video delivery. However, video cores are in many cases merely software-based implementations using the oscillator that is built into Off-the-Shelf (OTS) servers, which may not support the needed accuracy. In those cases, the advantage of working in async mode is eliminated as the video core requires an external GM upon which to rely for its clock.

Figure 5:
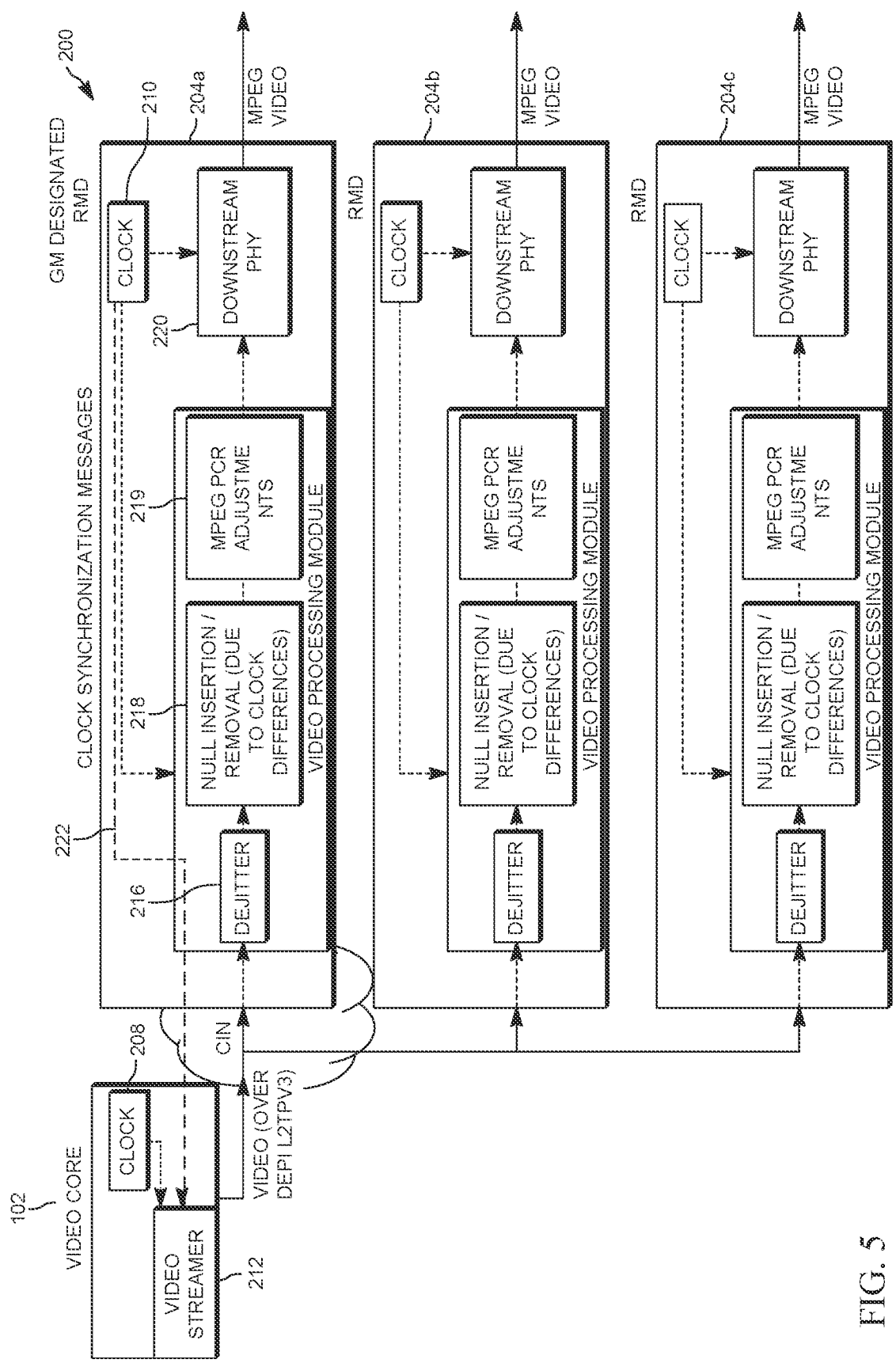
FIG. 5 shows an exemplary RMACPHY architecture operating in a partial async mode.

Accordingly, referring to FIG. 5, a system 200 may comprise a video core 202 connected to one or more RMDs 204a, 204b, 204c etc., each of which may preferably configured with the components shown in FIG. 3 with respect to RPD 104, i.e. the one or more RMDs may each be equipped with a dejitter buffer 216, the modules 118 and 119 to provide null packet insertion/packet removal and PCR adjustments respectively, a downstream PHY 220, and a clock 210. Also, those of ordinary skill in the art will appreciate that, although only RMDs are shown in FIG. 5, the system 200 may also include one or more RPDs.

As previously noted, in some embodiments, when the video core 202 loses connection to a timing grandmaster, the RMDs 204a, 204b, and 204c (as well as any RPDs 104 in the network) may preferably be configured to operate in async mode as previously described, so as to continue to process video packets received from video core 202. Yet, in order to reliably operate in async mode, the core 202 needs an adequate internal clock, which it may not be equipped with. In such an instance, the core 202 may use one of the RMDs 204a, 204b, or 204c as a designated grandmaster to provide more reliable timing information than its own clock is able to generate, as the RMDs will typically be provisioned with an oscillator that meets the requirements for MPEG video coding and transmission. In FIG. 5, for example, the clock 210 of the RMD 204a is acting as the designated grandmaster and sends clock synchronization messages 222 to the core 202. The synchronization messages in a preferred embodiment is sent from the clock 210 of the RMD 204a to the clock 208 of the video core. Preferably, each RMD 204a, 204b, 204c, etc. is capable of acting as a designated grandmaster if, for example a connection is lost between the video core 202 and any RMD previously acting as a designated grandmaster.

In this "partial async" mode, the video core 202 preferably locks to the designated RMD 204a as it would to any "regular" grandmaster timer, and bases its MPEG clock and PCRs from the designated RMD 204a. The designated RMD 204a may preferably only sync the video core clock 208 to its own clock 210, but will otherwise operate in async mode, as will all other RMDs 204b, 204c, etc. as well as any RPDs 104 in the network. The only purpose of the clock sync between the designated RMD 204a and video core 202 is to provide the video core 202 with a reliable MPEG compliant clock; there is no need to lock other RMDs 204b, 204c, etc. to that clock as they also are preferably operating in async mode. Nor is there any need to provide the designated RMD 204a with any other external clock reference to lock its own clock to, as it may rely on its own oscillator.

Any appropriate method may be used to select an RMD to act as the designated source of timing information for the video core 202 during async mode. As one example, a dedicated provisioning server may configure the video core 202 to connect to an RMD that it designates. Alternatively, each RMD 204a, 204b, 204c, etc. may be configured in async mode to send its timing information to the video core 202, which will itself designate which the streams to use as the designated grandmaster using, e.g. the Best Master Clock Algorithm (BMCA).

Regardless of which method is used to designate an RMD to operate as the designated grandmaster, because the RMD designated as the timing source for the video core 202 is not locked to an external clock, the timing base of the information sent to the vide core 202 may change suddenly, if for example, the designated RMD resets, or goes offline triggering another RMD to act as the designated grandmaster. This will cause the PCRs it inserts into the MPEG stream to "jump," which in turn may cause a problem in the decoder receiving the MPEG stream. Therefore, in some preferred embodiments, the video 202 core may set an appropriate "discontinuity indicator" flag on the first PCR packet adaptation field when it detects that a time base was changed. The RMDs (or RPDs) may thereby adjust the PCRs by which they re-stamp the video stream to remove the discontinuity.

Though the foregoing disclosure of a R-MACPHY device sending timing information to a video core while operating in async mode was described in the context of a system where the R-MACPHY device is capable of dynamically configuring itself to operate in sync mode or async mode, those of ordinary skill in the art will appreciate that the embodiment of FIG. 5 may be used in other circumstances, as well. For example, as previously noted, often RPDs and RMDs are capable of configuration in either one of async mode and sync mode, where a video core or other network device may simply configure its connected RPDs and RMDs to always operate in async mode. Even in this circumstance, the system shown in FIG. 5 may be of benefit. If the video core, for example, does not receive timing information from an external grandmaster while the remotely connected devices are configured to operate in async mode—either because it temporarily loses connection or because it simply is not configured to receive such information from an external grandmaster, the benefit of receiving more reliable timing information from an RMD than that provided by its own internal clock is apparent.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A video core communicating with a plurality of remote Distributed Access Architecture (DAA) devices, each having an internal oscillator and operating in ASYNC mode relative to the video core, the video core configured to:
receive respectively different synchronization messages from each of the plurality of DAA devices, the respective synchronization messages from each DAA device based upon its own internal oscillator;
use the respectively different synchronization messages to select a chosen one of the plurality of remote DAA devices;
use the synchronization messages from the chosen one of the plurality of remote DAA devices to modify PCR data in packets sent by the video core to each of the plurality of DAA devices.

2. The video core of claim 1, which uses a Best Master Clock Algorithm (BMCA) to select the chosen one of the plurality of remote DAA devices.

3. The video core of claim 1 where each of the remote DAA devices are Remote MACPHY Devices (RMDs).

4. The video core of claim 1 configured to selectively change which one of the plurality of DAA devices is the selected one of the plurality of DAA devices.

5. The video core of claim 1 configured to use timing data from a selected one of the plurality of DAA devices when the video core loses communication with a grandmaster timer.

6. A system comprising:
a video core;
a plurality of remote Distributed Access Architecture (DAA) devices in communication with, and operating in ASYNC mode relative to, the video core, the DAA devices receiving from the video core respective video streams, each comprising a plurality of sequential video packets;
the video core receiving timing data from a first one of the plurality of DAA devices and selectively using the timing data to stamp sequential video packets of a video stream sent to a second one of the plurality of DAA devices with Program Clock Reference (PCR) values.

7. The system of claim 6, where the video core uses a Best Master Clock Algorithm (BMCA) to select which of the plurality of remote DAA devices is the first one of the plurality of DAA devices.

8. The system of claim 7 where the video core is configured to change which of the plurality of remote DAA devices is the first one of the plurality of DAA devices.

9. The system of claim 6 where each of the remote DAA devices are Remote MACPHY Devices (RMDs).

10. The system of claim 6 where the video core is configured to use timing data from a selected one of the plurality of DAA devices only when the video core loses communication with a grandmaster timer.

11. The system of claim 6 including a provisioning server that instructs the video core as to which of the plurality of DAA devices is the first one of the plurality of DAA devices.

12. The system of claim 11, where the provisioning server uses a Best Master Clock Algorithm (BMCA) to select which of the plurality of remote DAA devices is the first one of the plurality of DAA devices.

13. The system of claim 11 where the provisioning server is configured to change which of the plurality of remote DAA devices is the first one of the plurality of DAA devices.

14. The system of claim 11 where the provisioning server is configured to use instruct the video core as to which of the plurality of DAA devices is the first one of the plurality of DAA devices only when the video core loses communication with a grandmaster timer.

15. The system of claim 6 where the plurality of DAA devices each have a dejitter buffer and each modifies the video stream based upon the PCR values received from the video core.

* * * * *